United States Patent
Zhou et al.

(10) Patent No.: US 11,374,878 B2
(45) Date of Patent: Jun. 28, 2022

(54) DATA PROCESSING METHOD AND APPARATUS

(71) Applicant: CHINA UNIONPAY CO., LTD., Shanghai (CN)

(72) Inventors: Yongkai Zhou, Shanghai (CN); Danni Jiang, Shanghai (CN); Qi Wang, Shanghai (CN); Dongjie He, Shanghai (CN)

(73) Assignee: CHINA UNIONPAY CO., LTD., Shanghai (CN)

( * ) Notice: Subject to any disclaimer, the term of this patent is extended or adjusted under 35 U.S.C. 154(b) by 0 days.

(21) Appl. No.: 17/279,413

(22) PCT Filed: Oct. 22, 2019

(86) PCT No.: PCT/CN2019/112568
§ 371 (c)(1),
(2) Date: Mar. 24, 2021

(87) PCT Pub. No.: WO2020/088311
PCT Pub. Date: May 7, 2020

(65) Prior Publication Data
US 2022/0014483 A1    Jan. 13, 2022

(30) Foreign Application Priority Data
Oct. 30, 2018  (CN) .......................... 201811279474.9

(51) Int. Cl.
*H04L 49/20*  (2022.01)
*H04L 69/16*  (2022.01)
*H04L 69/22*  (2022.01)

(52) U.S. Cl.
CPC ................................. *H04L 49/208* (2013.01)

(58) Field of Classification Search
CPC ......... H04L 51/18; H04L 51/04; H04L 51/06; H04L 51/14; H04L 51/20; H04L 51/24;
(Continued)

(56) References Cited

U.S. PATENT DOCUMENTS 9,928,379 B1 *  3/2018  Hoffer .................... G16H 50/20
10,002,526 B1 *  6/2018  Dyer ...................... G08C 17/02
(Continued)

FOREIGN PATENT DOCUMENTS

| CN | 108667921 A | 10/2018 |
| CN | 108712306 A | 10/2018 |

(Continued)

OTHER PUBLICATIONS

The World Intellectual Property Organization (WIPO) International Search Report for PCT/CN2019/112568 dated Jan. 22, 2020 6 Pages (including translation).

*Primary Examiner* — Khaled M Kassim
*Assistant Examiner* — Berhanu D Belete
(74) *Attorney, Agent, or Firm* — Anova Law Group, PLLC

(57) ABSTRACT

The present disclosure provides a method and a device for data processing. The method includes acquiring at least two pathways of communication messages, where the at least two pathways of communication messages are messages intercepted in a bypass manner from messages transmitted by a service processing system to an external system; and the service processing system does not execute logic of record storage; processing the at least two pathways of communication messages, and determining communication messages to-be-stored from the at least two pathways of communication messages processed; and according to the at least two pathways of communication messages, storing the communication messages to-be-stored in a database.

19 Claims, 3 Drawing Sheets

(58) Field of Classification Search
CPC .......... H04W 4/029; H04W 88/02; G06F 2221/0782; H04M 1/72457; H04M 1/72436; H04M 1/72454
See application file for complete search history.

(56) References Cited

U.S. PATENT DOCUMENTS

| | | | |
|---|---|---|---|
| 10,135,772 B2* | 11/2018 | Kuang | H04L 51/24 |
| 2010/0070471 A1* | 3/2010 | Yadava | G06F 16/2358 |
| | | | 707/615 |
| 2010/0318665 A1* | 12/2010 | Demmer | H04L 67/14 |
| | | | 709/227 |
| 2011/0225231 A1* | 9/2011 | Bansal | H04L 12/4641 |
| | | | 709/245 |
| 2016/0036825 A1* | 2/2016 | Manroa | H04W 12/068 |
| | | | 726/1 |
| 2018/0060308 A1* | 3/2018 | Liu | G06F 40/35 |
| 2018/0183901 A1* | 6/2018 | Lariviere | G06Q 40/08 |
| 2019/0140995 A1* | 5/2019 | Roller | G06F 40/295 |

FOREIGN PATENT DOCUMENTS

| | | |
|---|---|---|
| CN | 109446200 A | 3/2019 |
| JP | 5620881 B2 | 11/2014 |

* cited by examiner

DATA PROCESSING METHOD AND APPARATUS

CROSS-REFERENCE TO RELATED APPLICATIONS

This application is a national phase entry under 35 U.S.C § 371 of International Application No. PCT/CN2019/112568, filed on Oct. 22, 2019, which claims priority of Chinese Patent Application No. 201811279474.9, entitled "Method and Device for Data Processing", filed with the State Intellectual Property Office of P. R. China on Oct. 30, 2018, the entire content of all of which is incorporated herein by reference.

FIELD OF THE DISCLOSURE

The present disclosure generally relates to the technical field of data processing and, more particularly, relates to a method and a device for data processing.

BACKGROUND

In the application scenario of large Internet traffic, extremely high requirements are put forward for the processing capabilities of distributed systems. There is a type of service system which has extremely high processing performance and throughput requirements but may have a certain tolerance for the time delay of service data storage. Such systems may be collectively referred to as non-time-delay-sensitive service systems. For the non-time-delay-sensitive service systems, after the service processing is completed, it is necessary to wait for a storage system to store communication messages before proceeding to a next step of the service processing in the existing technology, which may affect the performance of the service processing and may not satisfy the sudden large quantity of Internet processing requests.

For the non-time-delay-sensitive service systems, there is a need to develop a method and a device which may asynchronously decouple and separate the service processing and data storage, and within the range of a time delay tolerance allowed by the data storage, may improve the service processing performance to satisfy the sudden large quantity of Internet processing requests.

BRIEF SUMMARY OF THE DISCLOSURE

Various embodiments of the present disclosure provide a method and a device for data processing for a non-time-delay-sensitive service system, which improves the performance of service processing under the premise of ensuring the consistency of the service processing and data stored in a database and satisfies a large number of sudden Internet processing requests.

Various embodiments of the present disclosure provide a data processing method, including:

acquiring at least two pathways of communication messages, where the at least two pathways of communication messages are messages intercepted in a bypass manner from messages transmitted by a service processing system to an external system; and the service processing system does not execute logic of record storage;

processing the at least two pathways of communication messages, and determining communication messages to-be-stored from the at least two pathways of communication messages processed; and according to the at least two pathways of communication messages, storing the communication messages to-be-stored in a database.

In the above-mentioned technical solution, the service processing and data storage are asynchronously decoupled and separated, the communication messages transmitted by the service processing system to the external system are intercepted in the bypass manner, and the data storage is performed according to the acquired communication messages. The service processing system does not execute the logic of record storage, that is, the service processing system does not transmit the communication messages to the database for storage, and there is no need to wait for the communication messages to be stored in the database before performing the next step of the service processing, which accelerates the speed of the service processing, improve service processing performance, and satisfy a large number of sudden Internet processing requests.

Optionally, acquiring the at least two pathways of communication messages includes:

copying communication messages through a switch port mirroring manner, and outputting at least one pathway of first communication messages; and copying communication messages through a link splitting interception manner, and outputting at least one pathway of second communication messages.

In the above-mentioned technical solution, two manners for acquiring communication messages are provided, that is, same communication messages are acquired through two independent manners without affecting the communication between the service processing system and the external system.

Optionally, processing the at least two pathways of communication messages includes:

for any one pathway of communication messages in the at least two pathways of communication messages, performing diverting processing on the communication messages; and pre-processing the diverted communication messages and extracting application layer information in the diverted communication messages after the pre-processing.

In the above-mentioned technical solution, the communication messages are processed to ensure the integrity of the data and the accuracy of data storage and also reduce the pressure on the database through data processing.

Optionally, according to the at least two pathways of communication messages, storing the communication messages to-be-stored in the database includes:

determining whether the communication messages to-be-stored are complete; and if not complete, according to the at least two pathways of communication messages, storing the communication messages to-be-stored in the database after being processed to be completed.

In the above-mentioned technical solution, when the messages to-be-stored are not complete, the communication messages to-be-stored are processed to be completed according to the at least two pathways of communication messages. That is, it is mainly based on the communication messages to-be-stored, in the case that the communication messages to-be-stored are not complete, the communication messages to-be-stored are processed to be completed according to other communication messages acquired, which ensures the accuracy of data storage.

Accordingly, various embodiments of the present disclosure provide a data processing device, including:

an acquiring unit, configured to acquire at least two pathways of communication messages, where the at least two pathways of communication messages are messages intercepted in a bypass manner from messages transmitted by a service processing system to an external system; and the service processing system does not execute logic of record storage;

a processing unit, configured to process the at least two pathways of communication messages, and determine communication messages to-be-stored from the at least two pathways of communication messages processed; and a storage unit, configured to, according to the at least two pathways of communication messages, store the communication messages to-be-stored in a database.

Optionally, the acquiring unit is specifically configured to:

copy communication messages through a switch port mirroring manner, and output at least one pathway of first communication messages; and copy communication messages through a link splitting interception manner, and output at least one pathway of second communication messages.

Optionally, the processing unit is specifically configured to:

for any one pathway of communication messages in the at least two pathways of communication messages, perform diverting processing on the communication messages; and pre-process the diverted communication messages, and extract application layer information in the diverted communication messages after the pre-processing.

Optionally, the storage unit is specifically configured to:

determine whether the communication messages to-be-stored are complete; and if not complete, according to the at least two pathways of communication messages, store the communication messages to-be-stored in the database after being processed to be completed.

Accordingly, various embodiments of the present disclosure provide a computing device, including:

a memory, configured to store program instructions; and a processor, configured to call the program instructions stored in the memory and execute the above-mentioned data processing method according to acquired programs.

Accordingly, various embodiments of the present disclosure provide a non-transitory computer-readable storage medium, including computer-readable instructions; and when a computer reads and executes the computer-readable instructions, the computer executes the above-mentioned data processing method.

BRIEF DESCRIPTION OF THE DRAWINGS

In order to clearly illustrate the technical solutions in various embodiments of the present disclosure, the accompanying drawings, which are required to be used in the description of disclosed embodiments, are briefly described hereinafter. Obviously, the accompanying drawings in the following description are merely certain embodiments of the present disclosure. Other accompanying drawings derived from such accompanying drawings may be acquired by those skilled in the art without creative work.

DETAILED DESCRIPTION

The technical solutions in various embodiments of the present disclosure are described clearly and completely in conjunction with the drawings in various embodiments of the present disclosure. Obviously, the described embodiments are merely a part of various embodiments of the present disclosure, but not all of various embodiments. Based on various embodiments of the present disclosure, all other embodiments obtained by those skilled in the art without creative work fall within the protection scope of the present disclosure.

Figure 1:
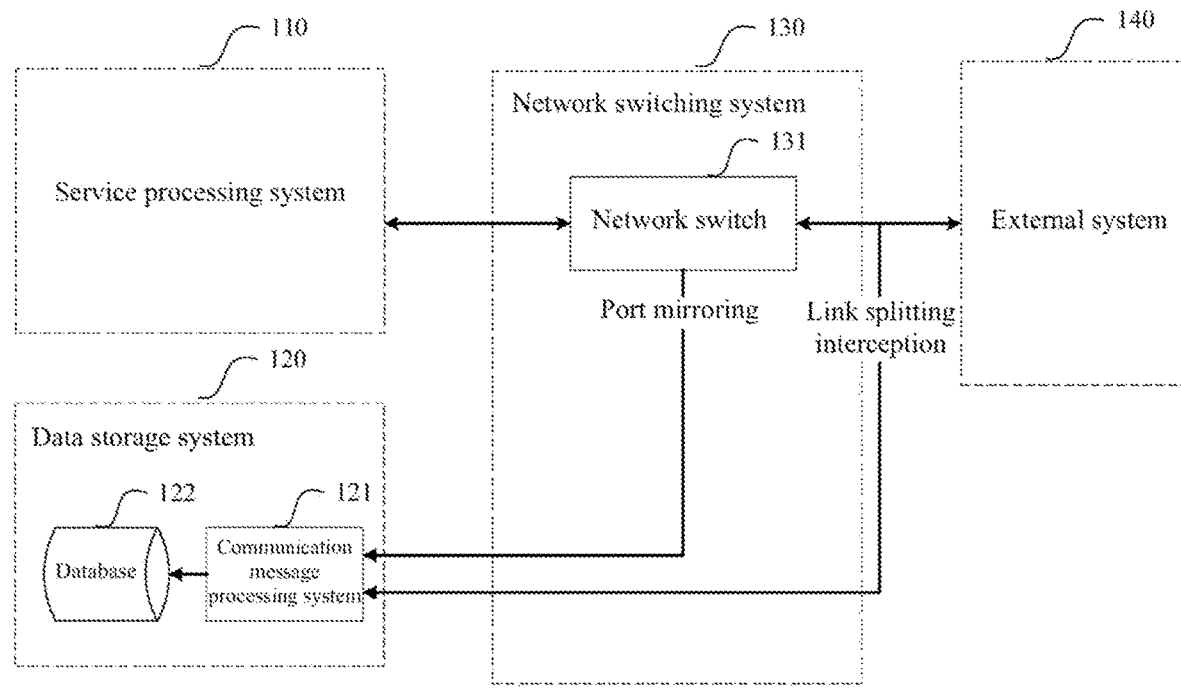
FIG. 1 illustrates a schematic of a system architecture in various embodiments of the present disclosure.

FIG. 1 illustrates a schematic of a system architecture in various embodiments of the present disclosure. The system architecture may include a service processing system 110, a data storage system 120, a network switching system 130, and an external system 140.

The service processing system 110 may be configured for service processing and outputting the results after the service processing.

The data storage system 120 may include a communication message processing system 121 and a database 122. The communication message processing system 121 may be configured to process communication messages and store the processed communication messages in the database 122.

The network switching system 130 may be mainly composed of a network switch 131, and the main function may be to perform the network communication between the service processing system 110 and the external system 140. The network switching system 130 may copy and output the network communication messages between the service processing system 110 and the external system 140 through a bypass interception manner and transmit the network communication messages to the data storage system 120.

Figure 2:
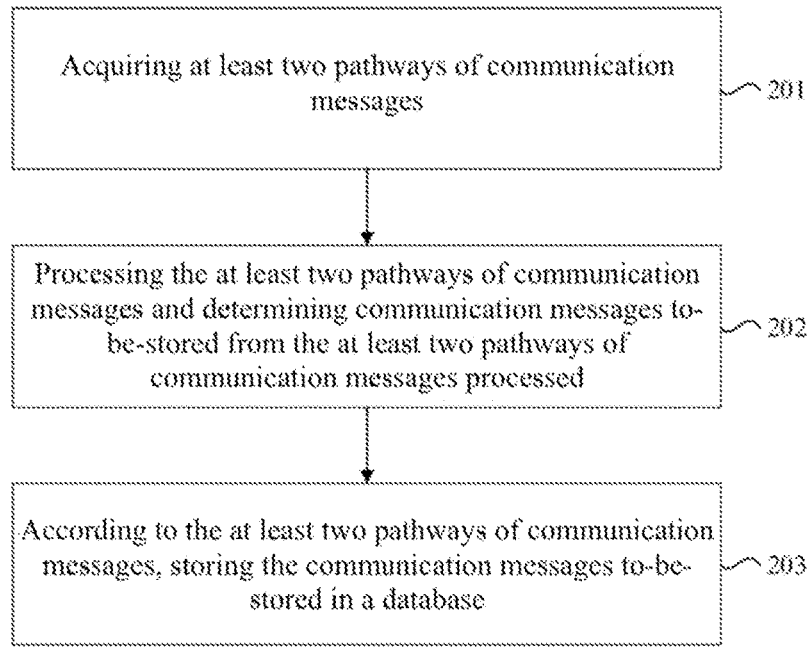
FIG. 2 illustrates a schematic flowchart of a data processing method in various embodiments of the present disclosure.

Based on the above-mentioned description, FIG. 2 illustrates a schematic flowchart of a data processing method in various embodiments of the present disclosure. The process may be executed by a data processing device. The data processing device may be located in a network switching system, for example, the network switching system in the present disclosure.

As shown in FIG. 2, the process may specifically include the following steps.

In step 201, at least two pathways of communication messages may be acquired.

At least two pathways of communication messages may be messages intercepted in a bypass manner from the messages transmitted by the service processing system to the external system through the bypass interception manner, where the service processing system may not execute the logic of record storage. In various embodiments of the present disclosure, the service processing and data storage may be asynchronously decoupled and separated; and the service processing system may only perform service processing, and there is no need to wait for the confirmation of data storage, that is, no logic of record storage is involved. The service processing system may be an electronic payment transfer system in a banking system.

When acquiring the communication messages, the communication messages may be acquired through the bypass interception manner. The bypass interception manner may include a switch port mirroring manner and a link splitting interception manner. The switch port mirroring manner and the link splitting interception manner may be two manners to acquire the communication messages in parallel. That is, when the bypass interception manner is used to acquire the communication messages, two interception manners may be used simultaneously, and each interception manner may acquire at least one pathway of communication messages, which is equivalent to acquiring at least two pathways of identical communication messages.

As an implementation manner, the communication messages may be copied through the switch port mirroring manner, and at least one pathway of first communication messages may be outputted; and the communication messages may be copied through the link splitting interception manner, and at least one pathway of second communication messages may be outputted. For example, one pathway of first communication messages may be acquired through the switch port mirroring manner, and one pathway of second communication messages may be acquired through the link splitting interception manner, where the first communication messages and the second communication messages are messages with same information.

In step 202, the at least two pathways of communication messages may be processed, and communication messages to-be-stored may be determined from the at least two pathways of communication messages processed.

The at least two pathways of acquired communication messages may be processed, that is, there is a need to process any one pathway of communication messages in the at least two pathways of communication messages. Specifically, the diverting may be performed on the communication messages; and after pre-processing the diverted communication messages, the application layer information in the diverted communication messages after the above-mentioned pre-processing may be extracted.

Taking the first communication messages acquired by the switch port mirroring manner as an example, the diverting may be first performed on the first communication messages, and it may ensure that the messages of a same session are split to a same processing node. The first communication messages after the diverting may be pre-processed, that is, the network layer metadata information may be extracted, the network layer header may be removed, and the entire session may be stitched and restored. Finally, the application layer information in the network messages after the pre-processing may be extracted.

Furthermore, after extracting the application layer information in the network messages after the pre-processing, the extracted data may also be cached and compressed locally, which may smooth network burst traffic and avoid a relatively large load on the database.

After processing the at least two pathways of acquired communication messages, the communication messages to-be-stored may be determined from the at least two pathways of communication messages after the processing. It should be understood that the at least one pathway of first communication messages may be acquired through the switch port mirroring manner and the at least one pathway of second communication messages may be acquired through the link splitting interception manner; after the data processing is performed on the at least one pathway of first communication messages and the at least one pathway of second communication messages, one pathway of communication messages to-be-stored may be determined from the at least one pathway of first communication messages processed and the at least one pathway of second communication messages processed. The communication messages to-be-stored may be one pathway of at least one pathway of first communication messages, or one pathway of at least one pathway of second communication messages. Optionally, one pathway of second communication message acquired through the link splitting interception manner may be determined as the communication messages to-be-stored.

In step 203, the communication messages to-be-stored may be stored in the database according to the at least two pathways of communication messages.

Specifically, whether the communication messages to-be-stored is complete may be first determined.

If it is determined that the communication messages to-be-stored is complete data, the communication messages to-be-stored may be directly stored in the database.

If it is determined that the communication messages to-be-stored is incomplete data, according to the at least two pathways of communication messages, the communication messages to-be-stored may be stored in the database after being processed to be completed. In other words, when the communication messages to-be-stored is incomplete, the incomplete communication messages to-be-stored may be processed to be completed according to the at least two pathways of communication messages. For example, the at least two pathways of communication messages are one pathway of first communication messages and one pathway of second communication messages; after the second communication messages are determined as the communication messages to-be-stored, if the second communication messages are not complete, the second communication messages may be processed to be completed according to the first communication messages, such that the complete communication messages may be stored in the database.

Figure 3:
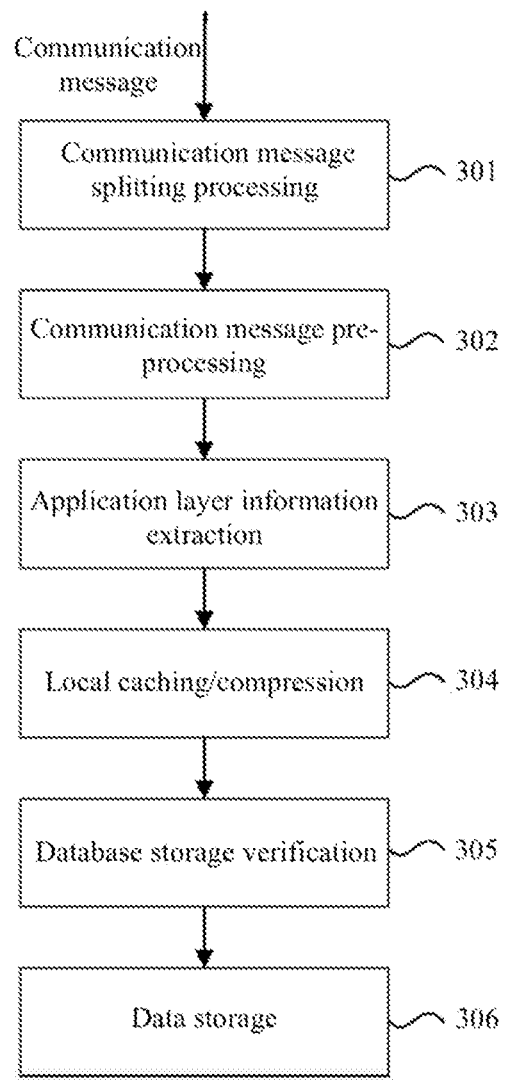
FIG. 3 illustrates a schematic flowchart of communication message processing in various embodiments of the present disclosure.

In order to better understand the above-mentioned implementation manner for processing the at least two pathways of communication messages, any communication messages may be taken as an example as shown in FIG. 3.

In step 301, the communication messages may be diverted.

Since the data volume of the communication messages acquired by the bypass interception manner is relatively large, the diverting processing may need to be performed first on the acquired communication messages, which is convenient for the processing by a back-end node. The diverting strategy may be self-defined according to the characteristics of the service, and it is necessary to ensure that the messages of a same session are split to a same processing node.

In step 302, the communication messages may be pre-processed.

The acquired communication messages may be in the format of TCP/IP (transmission control protocol/Internet protocol). The communication messages in the TCP/IP format may be pre-processed to extract the network layer metadata information, such as IP, port and the like; and the network layer header may be removed, and the entire session may be stitched and restored.

In step 303, the application layer information may be extracted.

The application layer information in the communication messages may be extracted. The information encoding of such part may be related to specific service logic, for example, the communication messages of a payment transfer system, such that metadata information of nearly a hundred fields may be extracted from the data in the communication messages.

Step 304 may be performed for local caching/compression.

For the extracted application layer data, local caching and compression may be performed to smooth network burst traffic and avoid causing a relatively large load on the back-end database.

Step 305 may be performed for storage verification of the database.

There are two manners to acquire the communication messages: the switch port mirroring manner and the link splitting interception manner, such that the integrity of the data source may be ensured to the greatest extent.

Optionally, the data may be mainly acquired by the link splitting interception method, and the data may be secondarily acquired by the switch port mirroring method, which is equivalent to acquiring one pathway of communication messages for each acquisition method, and the data acquired by the link splitting interception method may be used as the data to-be-stored. It may determine whether the data acquired by the link splitting interception method is complete, that is, whether the data to-be-stored can be successfully stored in the database and ensure consistency with the service processing. When the data acquired by the link splitting interception method is incomplete data, the data to-be-stored may need to be processed to be completed according to the data acquired by the switch port mirroring method.

In step 306, the data may be stored in the database.

The data that has passed the database storage verification may be stored in the database. Optionally, the data that has passed the database storage verification may be inserted into database tables through a database API (application programming interface), thereby completing the operation of storing data in the database.

It should be noted that the above-mentioned whole process from the communication message diverting processing to storing data in the database, a data delay of about 1 minute may be introduced according to different parameter settings, which may be the limit that the non-time-delay-sensitive service system can tolerate.

Figure 4:
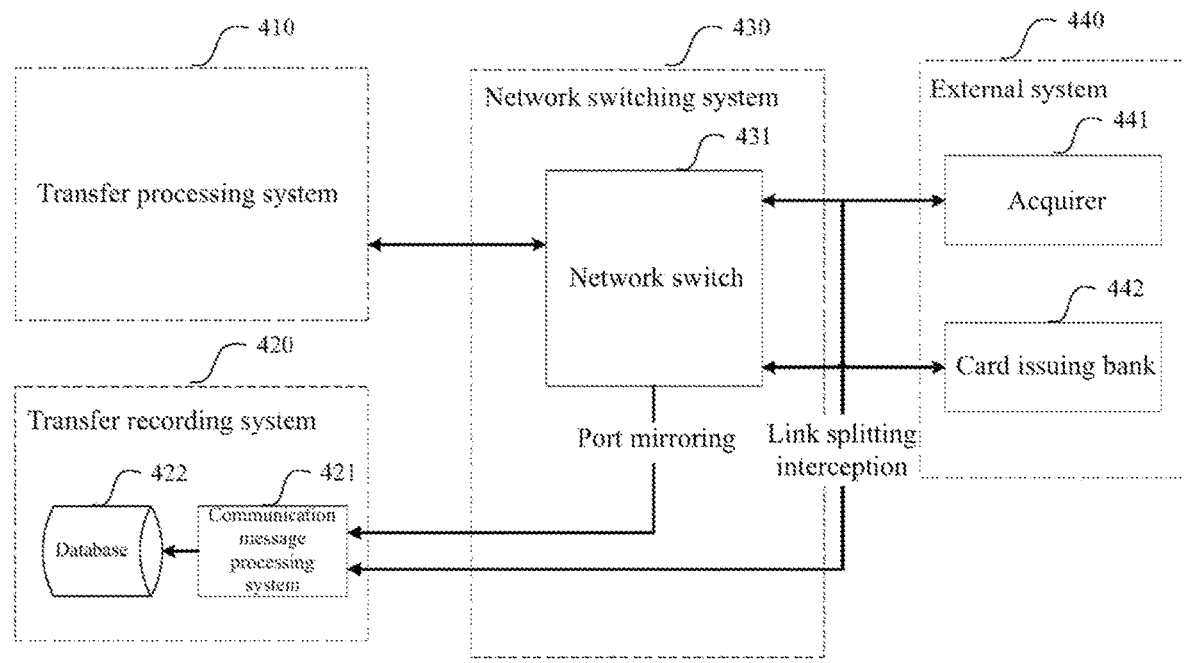
FIG. 4 illustrates a diagram of an electronic payment system in various embodiments of the present disclosure.

An electronic payment transfer system in the non-time-delay-sensitive service system may be taken an example to describe the specific implementation manner of the present disclosure hereinafter, specifically referring to the system architecture shown in FIG. 4. The communication connection performed between a transfer processing system 410 and an external system 440 may only be used for transfer service processing; the external system 440 may include an acquirer 441 and a card issuing bank 442; the transfer service processing may include receiving transfer requests from the acquirer 441, token verification, selecting an appropriate card issuing channel, transmitting messages to the card issuing bank 442 or processing the return messages from the card issuing bank 442 and forwarding the messages to the acquirer 441, and the like. The service processing of the transfer processing system 410 may not involve any transaction storage, that is, the transfer processing system 410 and a transfer recording system 420 may be asynchronously decoupled and separated. A network switching system 430 may acquire one pathway of second communication messages through the link splitting interception method, and acquire one pathway of first communication messages through the switch port mirroring method; a communication message processing system 421 may process the first communication messages and the second communication messages, determine the second communication messages to-be-stored, and decide whether the communication messages to-be-stored is complete; and if the communication messages to-be-stored is not complete, after the second communication messages are processed to be completed according to the first communication messages and the second communication messages, the second communication messages may be stored in a database 422.

It should be noted that the network switch in the network switching system may be a single physical network switch, or a switching matrix composed of multiple physical switches, or a logical virtual switch for a certain processing system in a cloud data center.

The database in the data storage system is a general term for the data storage form, and its specific form may be a centralized relational database, a distributed relational database, a file database, or a nosql database.

In the above-mentioned embodiments, the characteristics of the non-time-delay-sensitive service system may be fully utilized to asynchronously decouple and separate the service processing system and the data storage system, and the service processing system may only involve data processing logic without any data storage logic, thereby accelerating the service processing speed and satisfying a large number of sudden network processing requests. The network communication system may intercept the communication messages between the service processing system and the external system through the switch port mirroring method and the link splitting interception method, and the intercepted communication messages may be stored in the data storage system after being processed; moreover, the same communication messages may be acquired using two types of independent manners, which may ensure the success rate of storing the complete communication data in the database. Furthermore, the consistency of the service processing and stored data in the database may be insured.

Compared with the existing data processing method, the beneficial effects of various embodiments of the present disclosure may include:

high processing performance, where, by fully utilizing the characteristics of non-time-delay-sensitive service systems, the service processing and data storage may be asynchronously decoupled and separated, such that the result of each service processing may be quickly returned without waiting for the data result confirmation, thereby improving the processing performance when the network traffic is at peak to the maximum extent; meanwhile, the use of the burst and unevenness of the network traffic may allow data storage to have a certain storage time delay, thereby ensuring that the data in the overall time dimension is effectively cached and stored in the database;

a variety of manners ensuring the data being reliably recorded, where the data storage system may perform recording by intercepting transmitted communication data; the diverting of the communication data may adopt the switch port mirroring method and the link splitting interception method to be synchronized and independent, thereby ensuring that the communication data is not lost to the maximum extent; moreover, the bypass manner may be adopted, which may not affect the service processing performance;

high system reusability, where the communication data acquired through the bypass interception manner may be imported into the database after being processed; the existing network performance analysis system, such as NPM (network performance monitoring), may be multiplexed as such portion, and it may only need to perform further analysis for the messages at the application layer; since a certain storage time delay is allowed, a certain caching and optimization mechanism may effectively reduce the processing pressure of the database.

Figure 5:
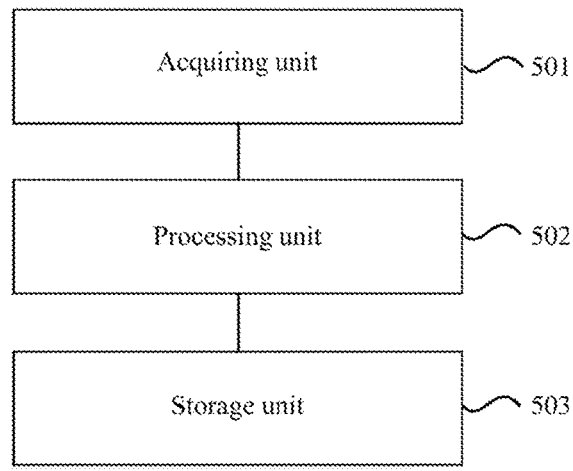
FIG. 5 illustrates a structural schematic of a data processing device in various embodiments of the present disclosure.

Based on the same inventive concept, FIG. 5 illustrates a structural schematic of a data processing device in various embodiments of the present disclosure. The device may execute the process of the data processing method.

An acquiring unit 501 may be configured to acquire at least two pathways of communication messages, where the at least two pathways of communication messages are messages intercepted in the bypass manner from messages transmitted by the service processing system to the external system; and the service processing system does not execute the logic of record storage.

A processing unit 502 may be configured to process the at least two pathways of communication messages and determine communication messages to-be-stored from the at least two pathways of communication messages processed.

A storage unit 503 may be configured to, according to the at least two pathways of communication messages, store the communication messages to-be-stored in the database.

Optionally, the acquiring unit 501 may be specifically configured to:

copy communication messages through the switch port mirroring manner, and output at least one pathway of first communication messages; and copy communication messages through the link splitting interception manner, and output at least one pathway of second communication messages.

Optionally, the processing unit 502 may be specifically configured to:

for any one pathway of communication messages in the at least two pathways of communication messages, perform diverting processing on the communication messages; and pre-process the diverted communication messages, and extract the application layer information in the diverted communication messages after the pre-processing.

Optionally, the storage unit 503 may be specifically configured to:

determine whether the communication messages to-be-stored are complete; and if not complete, according to the at least two pathways of communication messages, store the communication messages to-be-stored in the database after being processed to be completed.

Based on the same inventive concept, various embodiments of the present disclosure also provide a computing device, including:

a memory, configured to store program instructions; and a processor, configured to call the program instructions stored in the memory and execute the above-mentioned data processing method according to acquired programs.

Based on the same inventive concept, various embodiments of the present disclosure also provide a non-transitory computer-readable storage medium, including computer-readable instructions; when a computer reads and executes the computer-readable instructions, the computer may execute the above-mentioned data processing method.

The present disclosure is described with reference to flowcharts and/or block diagrams of methods, devices (systems), and computer program products according to various embodiments of the present disclosure. It should be understood that each process and/or block in the flowcharts and/or block diagrams, and the combination of processes and/or blocks in the flowcharts and/or block diagrams may be implemented by computer program instructions. Such computer program instructions may be provided to the processor of a general-purpose computer, a special-purpose computer, an embedded processor, or other programmable data processing apparatus, such that the instructions executed by the processor of the computer or other programmable data processing apparatus may implement the functions specified in one or more processes in the flowcharts and/or one or more blocks in the block diagrams.

Such computer program instructions may also be stored in a computer-readable memory that can direct a computer or other programmable data processing apparatus to work in a specific manner, such that the instructions stored in the computer-readable memory produce a manufacturing article including the instruction device. The instruction device implements the functions specified in one or more processes in the flowcharts and/or one or more blocks in the block diagrams.

Such computer program instructions may also be loaded on a computer or other programmable data processing apparatus, such that a series of operation steps are executed on the computer or other programmable apparatus to produce computer-implemented processing. Therefore, the instructions executed by the processor of the computer or other programmable data processing apparatus may implement the functions specified in one or more processes in the flowcharts and/or one or more blocks in the block diagrams.

Although preferred embodiments of the present disclosure have been described, those skilled in the art may make additional changes and modifications to such embodiments once they learn the basic creative concept. Therefore, the appended claims may be intended to be interpreted as including preferred embodiments and all changes and modifications falling within the scope of the present disclosure.

Obviously, those skilled in the art may make various changes and modifications to the present disclosure without departing from the spirit and scope of the present disclosure. In such way, if these modifications and variations of the present disclosure fall within the scope of the claims of the present disclosure and their equivalent technologies, the present disclosure may also be intended to include these modifications and variations.

What is claimed is:

1. A method for data processing, implemented by a network switching device, comprising:

intercepting, by simultaneously applying at least two bypass interception manners, an original communication message transmitted by a service processing system to an external system, to acquire at least two pathways of communication messages, each bypass interception manner being applied to acquire at least one pathway of communication message, wherein the at least two bypass interception manner include a switch port mirroring manner and a link splitting interception manner, each message of the at least two pathways of communication messages has same information as the original communication message, and the service processing system does not execute a storage operation of storing the original communication message;

processing the at least two pathways of communication messages, and determining a target communication message to-be-stored from the at least two pathways of communication messages processed; and according to the at least two pathways of communication messages, storing the target communication message in a database.

2. The method according to claim 1, wherein intercepting, by simultaneously applying the at least two bypass interception manners, the original communication message, to acquire the at least two pathways of communication messages includes:

copying the original communication message through the switch port mirroring manner, and outputting at least one pathway of first communication message, and copying the original communication message through the link splitting interception manner, and outputting at least one pathway of second communication message.

3. The method according to claim 2, wherein determining a target communication message to-be-stored from the at least two pathways of communication messages processed comprises:

determining that the second communication message acquired through the link splitting interception manner is the target communication message to-be-stored.

4. The method according to claim 3, wherein storing the target communication message in the database comprises:

determining whether the target communication message is complete; and if not complete, completing the target communication message according to the first communication message acquired through the switch port mirroring manner, and storing the completed target communication message in the database.

5. The method according to claim 1, wherein processing the at least two pathways of communication messages includes:

for any one pathway of communication message in the at least two pathways of communication messages, diverting the pathway of communication message to a corresponding processing node; and pre-processing the diverted communication message, and extracting application layer information from the pre-processed communication message.

6. The method according to claim 5, wherein diverting the pathway of communication message to a corresponding processing node comprises:

diverting the pathway of communication message to the corresponding processing node that has received a message of a same session as the pathway of communication message.

7. The method according to claim 6, wherein pre-processing the diverted communication message comprises:

extracting network layer metadata information from the pathway of communication message; and removing network layer header from the network layer metadata information; and stitching and restoring the session.

8. The method according to claim 1, wherein according to the at least two pathways of communication messages, storing the target communication message in the database includes:

determining whether the target communication message is complete; and if not complete, completing the target communication message according to another communication message from the at least two pathways of communication messages, and storing the completed target communication message in the database.

9. The method according to claim 8, wherein determining whether the target communication message is complete comprises:

determining whether data to-be-stored extracted from the target communication message can be successfully stored in the database and is consistent with a service processing record.

10. The method according to claim 8, wherein completing the target communication message according to another communication message from the at least two pathways of communication messages comprises:

when the target communication message is acquired through the link splitting interception manner, completing the target communication message according to one of the at least two pathways of communication messages acquired through the switch port mirroring manner; and when the target communication message is acquired through the switch port mirroring manner, completing the target communication message according to one of the at least two pathways of communication messages acquired through the link splitting interception manner.

11. The method according to claim 1, wherein the service system does not wait for a confirmation that the target communication message is stored.

12. A network switching device for data processing, comprising:

a memory, configured to store program instructions for performing a method for data processing; and a processor, coupled with the memory and, when executing the program instructions, configured to:

intercept, by simultaneously applying at least two bypass interception manners, an original communication message transmitted by a service processing system to an external system, to acquire at least two pathways of communication messages, each bypass interception manner being applied to acquire at least one pathway of communication message, wherein the at least two bypass interception manner include a switch port mirroring manner and a link splitting interception manner, each message of the at least two pathways of communication messages has same information as the original communication message, and the service processing system does not execute a storage operation of storing the original communication message;

process the at least two pathways of communication messages, and determine a target communication message to-be-stored from the at least two pathways of communication messages processed; and according to the at least two pathways of communication messages, store the target communication message in a database.

13. The device according to claim 12, wherein the processor is further configured to:

copy the original communication message through the switch port mirroring manner, and outputting at least one pathway of first communication message; and copy the original communication message through the link splitting interception manner, and outputting at least one pathway of second communication message.

14. The device according to claim 12, wherein the processor is further configured to:

for any one pathway of communication message in the at least two pathways of communication messages, divert the pathway of communication message to a corresponding processing node; and pre-process the diverted communication message, and extract application layer information from the pre-processed communication message.

15. The device according to claim 12, wherein the processor is further configured to:

determine whether the target communication message is complete; and if not complete, complete the target communication message according to another communication message from the at least two pathways of communication messages, and store the completed target communication message in the database.

16. A non-transitory computer-readable storage medium, containing program instructions that, when executed by a processor of a network switching device, causing the processor to perform:

intercepting, by simultaneously applying at least two bypass interception manners, an original communication message transmitted by a service processing system to an external system, to acquire at least two pathways of communication messages, each bypass interception manner being applied to acquire at least one pathway of communication message, wherein the at least two bypass interception manner include a switch port mirroring manner and a link splitting interception manner, each message of the at least two pathways of communication messages has same information as the original communication message, and the service processing system does not execute a storage operation of storing the original communication message;

processing the at least two pathways of communication messages, and determining a target communication message to-be-stored from the at least two pathways of communication messages processed; and according to the at least two pathways of communication messages, storing the target communication message in a database.

17. The storage medium according to claim 16, wherein intercepting, by simultaneously applying the at least two bypass interception manners, the original communication message, to acquire the at least two pathways of communication messages includes:

copying the original communication message through the switch port mirroring manner, and outputting at least one pathway of first communication message; and copying the original communication message through the link splitting interception manner, and outputting at least one pathway of second communication message.

18. The storage medium according to claim 16, wherein processing the at least two pathways of communication messages includes:

for any one pathway of communication message in the at least two pathways of communication messages, diverting the pathway of communication message to a corresponding processing node; and pre-processing the diverted communication message, and extracting application layer information from the pre-processed communication message.

19. The storage medium according to claim 16, wherein according to the at least two pathways of communication messages, storing the target communication message in the database includes:

determining whether the target communication message is complete; and if not complete, completing the target communication message according to another communication message from the at least two pathways of communication messages, and storing the completed target communication message in the database.

* * * * *